United States Patent Office 3,793,240
Patented Feb. 19, 1974

3,793,240
POLYURETHANE FOAMS
John Liberty Smith, Water Orton, near Birmingham, England, assignor to Dunlop Limited, St. James's, London, England
No Drawing. Filed Sept. 7, 1972, Ser. No. 286,888
Claims priority, application Great Britain, Sept. 22, 1971, 44,142/71
Int. Cl. C08g 33/02, 51/58, 22/44
U.S. Cl. 260—2.5 AB                    9 Claims

ABSTRACT OF THE DISCLOSURE

Flame-resistant polyurethane foams are obtained by reacting a polymeric polyol with an organic polyisocyanate in a reaction mixture which contains (a) as a catalyst an anionic surfactant and (b) an acidogenic substance as an anti-aging additive. Suitable catalysts are the sodium or potassium salt of oleic acid, and the anti-aging additive is preferably a chloro- or bromo-derivative of a trialkyl orthophosphate, of which the following is a specification.

This invention relates to polyurethane foams, particularly to flame-resistant polyurethane foams, and to methods of making them.

We have found, according to the present invention, that polyurethane foams having good resistance to burning (flame-resistance) can be obtained by a process in which a polymeric polyol is reacted with an organic polyisocyanate in a foam-forming reaction mixture which contains:

(a) as a catalyst an anionic surfactant, and
(b) an anti-aging additive substantially to limit any deleterious effect of the anionic surfactant on aging of the polyurethane foam.

The anionic surfactant can comprise, for example, one or more of the following: (a) an alkali metal or other salt of a long chain fatty acid, for instance sodium and potassium salts of saturated or unsaturated carboxylic acids having 10–20 carbon atoms. Suitable substances are, the sodium and potassium salts of fatty acids, for instance the monocarboxylic acids, oleic, stearic, myristic and palmitic acids; and (b) an alkali metal or other salt of a disproportinated rosin acid.

"Disproportionated rosin acid" is the name given to the products obtained by the disproportionations of abietic acid, which comprise a mixture of tetrahydroabietic acid, dehydroabietic acid and dihydroabietic acid.

The disproportionation can be effected, for example, using carbon dioxide and a palladium catalyst.

The foams of this invention have good flame-resistance properties, and a particular advantage is that when subjected to flame they give off much less smoke than do conventional flame-resistant foams containing large amounts of halogen compounds or like flame retardants. This is a most valuable practical advantage because emission of noxious smoke and fumes when subjected to flame is one of the principal shortcomings of such conventional flame-resistant foams.

The amount of the anionic surfactant incorporated in the foam-forming reaction mixture depends upon the particular anionic surfactant used and the nature of the other components of the foam-forming reaction mixture. Thus, where the anionic surfactant is a fatty acid soap such as potassium oleate, an amount of 1–4%, for instance 1.5–3% is suitable, but where a disproportinated rosin acid soap is used the amount necessary is in general somewhat greater, for instance up to 6% (especially 2–5%) by weight of the polyol component. The surfactant can be incorporated in various ways according to convenience.

It has been found that the catalysts used in the process of the present invention are so effective that polyols can be used which are normally regarded as being relatively slowly reacting. Thus, the polyol can be a polyether, for example, a poly(oxypropylene) polyol having few, if any, terminal primary hydroxyl groups. Suitable polyols of this sort are poly(oxypropylene) triols (often referred to as "polypropylene glycols"), for example, those having molecular weights of 3000–6000, and poly(oxypropylene) poly(oxyethylene) triols, for example those of molecular weight from 3000 to 6000, in which substantially all of the terminal hydroxyl groups are secondary hydroxyl groups.

Polyols of greater activity can be used if desired, such as those having a substantial proportion of primary hydroxyl end groups, usually referred to as "ethylene oxide-tipped polyols." Suitable ethylene oxide-tipped polyols are those in which the primary hydroxyl groups comprise 20 to 70% (for example 50–60% or 60–70%) of the total number of hydroxy groups in that polyol. A suitable polymeric polyol is one obtained by reacting a substance having a plurality of active hydrogen atoms with an alkylene oxide (for instance propylene oxide or a mixture of propylene oxide and ethylene oxide), and subsequently reacting the product thus obtained with ethylene oxide so as to introduce the terminal primary hydroxy groups. Examples of polyether polyols of this type are polyether triols of very high activity having a mean molecular weight of 4500–5100 and a "hydroxyl number" of 33–37.

The flame retardant foams of the invention can be, for example, foams of density up to 64 kg./m.$^3$, especially having densities in the range 16–40 kg./m.$^3$.

The anti-aging additives used in the process of this invention are in general acidogenic substances which under the conditions in the foam-forming reaction mixture can generate an acid sufficiently strong effectively to neutralize any excess or unwanted basic catalyst. The generation of the acid can be effected, for example, by the action of heat and/or water.

It is particularly convenient if the anti-aging additive is such that it is decomposed to give an acid under the influence of the heat generated in the exothermic foam-forming reaction, and any residue not so decomposed is stable. The anti-aging additive should be such that neither it, nor any residue remaining after generation of acid, interferes with the foam-forming reaction or has a deleterious effect on the resulting foam product.

The anti-aging additive can be, for instance a substance containing labile halogen. Suitable anti-aging additives are halogenated aliphatic phosphate esters, such as chloro- and bromo-derivatives of trialkyl orthophosphates, for example compounds of the formula $R_3PO$ where R is a halogenated—preferably polyhalogenated—alkyl group of 2, 3 or 4 carbon atoms. Examples of suitable anti-aging additives are tri-betachloroethyl phosphate, tris-dichloropropyl phosphate, and tris-dibromopropyl phosphate (T.B.P.P.) which is particularly effective. Although some of these compounds are themselves flame retardants and although they contribute towards the flame-resistance of the foams, their effect in this direction is only minor and the flame-resistance of the foams is due in the main to the use of the catalyst of this invention. The amount of anti-aging additive to be used depends of course upon the particular additive used and also the type of foam in which it is to be used. However, in general an amount of 0.4–5 parts (especially 1.5–3 parts) per hundred parts of the polyol component has been found to be effective. It is to be noted that such amounts are much less than the amounts in which, for example, T.B.P.P. is conventionally used as a flame retardant additive—usually about 15–20 parts per hundred of polyol. Where an organic bromo compound is used as the additive, it has been found that specially effective amounts are those corresponding to an amount of up to 0.25% (for example 0.05–0.1%) by weight of bromine per 100 parts of polyol component. Where the additive is a chloro compound the specially effective amounts are those corresponding to an amount of up to 0.5% (for example 0.1–0.2%) of chlorine weight per 100 parts of polyol component.

The anti-aging additives are in general covalent organic compounds which contain a labile halogen atom or atoms. Such compounds can lose their labile halogen (for example, as a result of interaction between the halogen and alkali metal ions). The additives shoul be such that neither they, nor the residual substance left after loss of the labile halogen, have an undesirable effect on the reactions in the foam-forming reaction mixture. It is though that the preferred additives, referred to above, probably do not lose their halogen until the early stages of the foam-forming reaction are complete, but that they then lose halogen (perhaps due to the exothermic heat produced in the reaction) which can then combine with alkali metal ions in the reaction mixture and thereby preclude their interference with the reaction mechanism or their having any deleterious effect on the foam product.

Small amounts of other catalysts may be used in the process of the invention if desired. Suitable catalysts are, for example dimethyl ethanolamine, N-methyl and N-ethyl morpholines, triethylamine, triethylene diamine (also known as 1,4-diazobicyclo 2,2,2- octane), and other tertiary amine catalysts.

Under certain circumstances, for example when harder foams are requred, cross-linking agents may be employed. Examples of suitable cross-linking agents are hydroxy amines, for example triethanolamine and tetrakis N beta-hydroxypropyl ethylene diamine; low molecular weight polyols, such as tetrols, hydroxyethers, for example tris-hydroxypropyl glycerol, and ortho-dichloro methylene bis-aniline.

In general the polyisocyanate and polyol components can be used in amounts such that the isocyanate index is of a normal value, for example in the range 100–110. However, isocyanate index values outside that range can be used if desired, but it has not been found necessary to exceed a value of 150.

The polyisocyanate can be for example tolylene diisocyanate (T.D.I.). Where T.D.I. is referred to herein it can contain one or more isomers thereof. For example, it can be tolylene-2:4-diisocyanate or a mixture of this with other isomers of tolylene diisocyanate, for example a mixture of the 2:4- and 2:6-isomers in the proportions by weight of 80/20 (80:20 T.D.I.) or 65/35 (65:35 T.D.I.).

The T.D.I. can be, for example, pure T.D.I. crude T.D.I. or T.D.I. in polymeric form, or a mixture thereof. Crude T.D.I. can be obtained by reacting the appropriate diamino-toluene with phosgene without any substantial purification. It is believed to contain material of polyurea and polybiuret structure. Where a mixture of 2,4- and 2,6-diamino-toluene is used, the crude T.D.I. contains the corresponding 2,4- and 2,6-diisocyanates.

Polymeric T.D.I. is normally of uretdione or isocyanurate structure. It can be obtained from pure T.D.I. in a separate preliminary reaction using polymerization techniques well-known in the art.

It has been found advantageous to include small proportions of polydimethyl siloxane in the formulation to modify pore structure. A typical amount is, for example, in the range of 0.05% to 0.1% by weight, on the weight of the polyol, of a 5-centistoke-grade. Alternatively, or in addition, small proportions of polysiloxane-oxyalkylene block copolymers can be use. If such block copolymers are used they should preferably be in an amount of not more than 0.2% by weight on the weight of the polyol, particularly 0.05% to 0.1%. The use of large quantities of polysiloxane-oxyalkylene block copolymers should be avoided as this can detract from the flame-resistant properties of the polyurethane foam obtained.

Besides the usual foam slabstock (block) and hot-cured mouldings, the polyurethane foams of the invention can also be obtained in moulded form by a cold-cure moulding method, that is, a method in which the foam-forming reaction mixture is moulded and allowed to cure without the application of heat. Moreover, the foams of the invention are suitable for use in flame lamination to textile and other substrates.

Although it is not intended that the present invention should be construed with reference to any particular theory, it is thought that the anionic surfactant catalyst has the effect of producing a polyurethane foam having a special structure such that when subjected to flame the foam tends to melt and thereby retract from the flame. This view is supported by observation of what happens to a foam of the invention when a lighted match is placed on a block of it, viz that the region of the foam subjected to the heat of the flame retreats away from the flame without any substantial burning.

The invention is illustrated by the following examples, in which flexible polyurethane foams are obtained by the one-shot or single stage method.

In the examples Polyol A is a poly(oxypropylene) poly-(oxyethylene) triol having a molecular weight of about 5000 a hydroxyl Number of 35–37 and a poly(oxyethylene) content of about 12–13% by weight. The proportion of the hydroxyl groups of this polyol which are primary hydroxyl groups is in the range 60–70% of the total number of hydroxyl groups. Polyol B is a poly(oxypropylene) poly(oxyethylene) triol having a molecular weight of about 3500 and a hydroxyl number of about 48. Substantially all the hydroxyl groups of this polyol are secondary hydroxyl groups. Polyol C is a poly(oxypropylene) triol, and substantially all of its hydroxyl groups are secondary hydroxyl groups. It has a molecular weight of about 3000 and a hydroxyl number of about 56.

The silicone is a commercial silicone oil having a viscosity of 5 centistokes and is a dimethyl siloxane homopolyfer. T.B.P.P. is tris-dibromopropyl phosphate used as anti-aging additive. The T.D.I. is 80:20 T.D.I.

EXAMPLE 1

A flexible polyurethane foam was obtained using the following formulation:

Polyol _____ 100
Catalyst: Potassium salt of disproportionated rosin
  acid _____ 4
T.D.I. _____ 54.4
T.B.P.P. _____ 2.0
Silicone _____ 0.05
Water _____ 4.55

In this example, and in the other examples, the amounts of the ingredients are shown in parts by weight.

The procedure used to make the foam was as follows. First, the catalyst was dissolved in the polyol, and to the solution were added the T.B.P.P., silicone and water, and the whole was stirred. Then the T.D.I. was added and the stirring was continued. When the resulting foam-forming reaction mixture started to "cream" it was immediately poured into an open mold.

The subsequent rise of the foam was completed in 25 seconds, and when the foam was tack-free it was removed from the mould. The polyurethane foam thus obtained had a fine, regular structure having cells of medium size, and although it had some closed cells it was easily converted to an open-cell foam by passage between rollers.

EXAMPLE 2

A polyurethane foam was obtained using the procedure of Example 1 and the following formulation:

Polyol B _____ 100
T.D.I. _____ 54.4
Catalyst: Sodium salt of disproportionated rosin acid 3.75

| | |
|---|---|
| T.B.P.P. | 2.0 |
| Silicone | 0.05 |
| Water | 4.55 |

The rise of the foam was completed in 45 seconds and the foam product obtained had a fine, regular structure. Although it had a substantial content of closed cells, it was easily converted to an open-cell foam by passage between rollers.

EXAMPLE 3

A polyurethane foam was obtained using the procedure of Example 1 and the following formulation:

| | |
|---|---|
| Polyol C | 100 |
| Catalyst: Potassium salt of disproportionated rosin acid | 4.0 |
| T.D.I. | 54.4 |
| T.B.P.P. | 2.0 |
| Silicone | 0.05 |
| Water | 4.55 |

The rise of the foam was completed in 45 seconds and the foam obtained had a fine, regular structure very largely of open cells.

EXAMPLE 4

A polyurethane foam was obtained using the procedure of Example 1 and the following formulation:

| | |
|---|---|
| Polyol B | 100 |
| Potassium oleate | 1.75 |
| T.D.I. | 54.4 |
| T.B.P.P. | 2.0 |
| Silicone | 0.05 |
| Water | 4.55 |

The rise of the foam was completed in 45 seconds and the foam product obtained had a fine, regular structure and consisted very largely of open cells.

The foam products of Examples 1–4 were all highly self-extinguishing, the mean extent burnt (M.E.B.) of each product being as follows

| Example No.: | M.E.B. (mm.) |
|---|---|
| 1 | 27.5 |
| 2 | 25.0 |
| 3 | 35 |
| 4 | 87.5 |

Having now described my invention, what I claim is:

1. A flame-resistant flexible foam having improved smoke producing characteristics when subjected to a flame, said foam being prepared by a process which comprises reacting a polymeric polyol with an organic polyisocyanate in a foam-forming reaction mixture containing an alkali metal salt of a disproportionate rosin acid catalyst, and as an anti-aging material up to about 5 parts by weight per 100 parts of polyol of a halogenated aliphatic phosphate ester and up to about 0.2% based on the weight of polyol of a polysiloxane-oxyalkylene block copolymer or up to about 0.5% based on the weight of polyol of a polydimethyl siloxane.

2. The foam of claim 1 wherein the polyisocyanate is a tolylene diisocyanate.

3. The foam of claim 1 wherein the amount of anti-aging material is from 0.4 to 5 parts by weight per 100 parts polyol.

4. A product according to claim 1 in which the acidogenic substance is a substance containing labile halogen.

5. A product according to claim 4 in which the acidogenic substance is a halogenated aliphatic phosphate ester.

6. A product according to claim 5, in which the ester is a chloro- or bromo-derivative of a trialkyl orthophosphate.

7. A product according to claim 6, in which said additive is tris 2,3-dibromopropyl orthophosphate.

8. A product according to claim 4 in which the amount of the acidogenic substance is 0.5–4% by weight of the polyol component.

9. A product according to claim 1 in which the polyol is one whose hydroxyl groups are substantially all secondary hydroxyl groups.

References Cited

UNITED STATES PATENTS 3,067,149    12/1962    Dombrow    260—2.5 B B

FOREIGN PATENTS 1,155,768    6/1969    Great Britain    260—2.5 AW
908,337    10/1962    Great Britain    260—2.5 AW DONALD E. CZAJA, Primary Examiner C. W. IVY, Assistant Examiner U.S. Cl. X.R.

260—2.5 AG, 2.5 AW, 2.5 BB